United States Patent
Kishimoto et al.

(10) Patent No.: US 6,528,205 B1
(45) Date of Patent: Mar. 4, 2003

(54) NON-WOVEN FABRIC SEPARATOR FOR SEALED ELECTROLYTIC CELLS

(75) Inventors: Kenjiro Kishimoto, Osaka (JP); Toshio Kitami, Osaka (JP); Masaaki Sasaki, Osaka (JP); Tsuyoshi Kameda, Osaka (JP); Makoto Kobayashi, Osaka (JP)

(73) Assignees: Yuasa Corporation, Osaka (JP); Nippon Sheet Glass Co., Ltd., Osaka (JP)

( * ) Notice: Subject to any disclaimer, the term of this patent is extended or adjusted under 35 U.S.C. 154(b) by 0 days.

(21) Appl. No.: 09/719,220

(22) PCT Filed: Jun. 8, 1999

(86) PCT No.: PCT/JP99/03042

§ 371 (c)(1),
(2), (4) Date: Dec. 11, 2000

(87) PCT Pub. No.: WO99/65092

PCT Pub. Date: Dec. 16, 1999

(30) Foreign Application Priority Data

Jun. 9, 1998 (JP) ............................................. 10-160239

(51) Int. Cl.⁷ ................................................ H01M 2/16
(52) U.S. Cl. ........................ 429/143; 429/252; 429/254
(58) Field of Search .................................. 429/129, 143, 429/247–249, 251, 252, 254

(56) References Cited

U.S. PATENT DOCUMENTS 3,978,263 A * 8/1976 Wellensiek .................. 156/254
4,097,644 A * 6/1978 Evensen et al. ............. 162/145

FOREIGN PATENT DOCUMENTS

JP        6-163020        6/1994        ............ H01M/2/16

OTHER PUBLICATIONS

International Search Report for PCT/JP99/03042 dated Aug. 17, 2000.

* cited by examiner

Primary Examiner—Patrick Ryan
Assistant Examiner—Susy Tsang-Foster
(74) Attorney, Agent, or Firm—Sughrue Mion, PLLC

(57) ABSTRACT

A separator for sealed cells is provided which attains a high degree of intimate contact with electrode plates, enables the cell to have reduced internal resistance, is less apt to suffer a fatigue phenomenon even upon repetitions of charge/discharge, and improves the life of the cell. Fine rubber particles are adhered to the surface of fibers of a non-woven fabric constituting the separator so that the fine rubber particles are present among the fibers. These fine rubber particles function as elastic bodies to absorb relative positional changes of the fibers and improve the compressive repulsion of the separator.

4 Claims, No Drawings

NON-WOVEN FABRIC SEPARATOR FOR SEALED ELECTROLYTIC CELLS

TECHNICAL FIELD

This invention relates to a separator which prevents a sealed cell from suffering short-circuiting between electrode plates and holds an electrolyte in the cell.

BACKGROUND ART

A sealed cell (hereinafter simply referred to as "cell") has electrode plates inside and a sheet-form separator interposed therebetween for preventing short-circuiting. This separator usually comprises a non-woven fabric, which is produced by a method comprising subjecting a slurry solution of thin short fibers (about 50% thereof have a diameter of 4 $\mu$m or smaller; length, 25 mm or shorter) to sheet formation by a papermaking process. Size and thickness of the separator are suitably regulated according to the intended use thereof.

A cell functions when charge transfer occurs between the electrode plates and the electrolyte, and this electrolyte is present in the state of being held by the separator. The electrolyte generally is an aqueous solution, and there are cases where an additive is added to the aqueous solution to make it have a higher viscosity or be in a gel state so as to be more readily held by the separator.

Cell performances improve with decreasing internal resistance and as the electrolyte becomes difficult to form a layer (this layer formation by an electrolyte is hereinafter referred to simply as "layer formation"). The internal resistance of a cell (hereinafter referred to simply as "internal resistance") is considerably influenced by charge mobility in the electrolyte and chars transferability between the electrode plates and the electrolyte.

Although the separator itself is a factor which elevates internal resistance because it inhibits the transport of ions, it is indispensable to prevent short-circuiting between electrode plates and layer formation. A separator comprising a non-woven fabric has innumerable pores therein; the more and larger the pores, the higher the ion transportability and the lower the internal resistance. However, a separator in which the degree thereof is too high shows impaired electrolyte retention and is apt to cause layer formation.

Charge transfer between the electrode plates and the electrolyte occurs by oxidation-reduction reactions between the electrode plates and ions. It is important for the separator to be in intimate contact with the electrode plates because charge transfer between the electrode plates and the electrolyte occurs only when the ions come into contact with the electrode plates. Namely, the degree of intimate contact between the separator and the electrode plates is an important factor in internal resistance. In order to increase the degree of intimate contact, a separator is compressed and inserted between electrode plates. As a result of the compression, the separator comes into intimate contact with the electrode plates due to its repulsive force and restoring force.

It is, however, known that upon injection of an electrolyte, the separator decreases its repulsive force and restoring force. It is generally thought that this decrease in separator restoring force is attributable to the surface tension of the electrolyte which has come into the spaces among the constituent fibers of the separator. Namely, the injection of an electrolyte reduces the degree of intimate contact between the separator and the electrode plates.

Furthermore, since the electrode plates expand/contract upon every charge/discharge, the separator repeatedly receives an external compressive/relaxation force. Because of this, separators having low restoring force suffer the so-called "fatigue phenomenon" in an early stage, resulting in an abrupt decrease in the degree of intimate contact.

Improvement in separators has enthusiastically been made to increase the degree of intimate contact between a separator and electrode plates. Examples thereof include an invention in which inorganic particles which gel upon contact with an electrolyte are caused to be present in a separator beforehand (Unexamined Published Japanese Patent Application No. 4-32158) and an invention in which fine polyethylene particles are mixed into a separator to impart elasticity to the separator (Unexamined Published Japanese Patent Application No. 5-67463).

However, the conventional inventions have had the following problems.

In the invention in which inorganic particles are caused to be present in a separator beforehand, the inorganic particles in the separator did not completely gel upon impregnation with an electrolyte. Consequently, since the restoring force of this separator does not considerably differ from that in the case where no inorganic particles are contained, the degree of intimate contact between electrodes and the separator was not sufficiently improved.

Furthermore, when the amount of the inorganic particles present in the separator is large, inorganic particles and the inorganic particles which have gelled occupy the pores of inner parts of the separator and this makes the transport of ions difficult. There have been further problems, for example, that since the separator itself has a reduced compressibility, operation for inserting the separator between electrode plates becomes difficult. Before being inserted between electrode plates, a separator is compressed by mechanically applying a high pressure thereto until the thickness thereof decreases to about a half. If this compression becomes difficult, an apparatus for this use only becomes separately necessary.

On the other hand, the invention in which fine polyethylene particles are caused to be present in a separator aims at weakening the adhesion between fibers to thereby make the separator elastic. Namely, this technique is intended to enable the degree of intimate contact between the separator and electrode plates to be uniform throughout. Consequently, even when fine polyethylene particles are caused to be present, the degree of intimate contact between the separator and electrode plates cannot be improved.

The present invention has been achieved in view of the problems accompanying such conventional techniques. An object thereof is to provide a separator for sealed cells which attains a high degree of intimate contact with electrode plates, i.e., attains reduced internal resistance, and which is less apt to suffer the fatigue phenomenon even in repetitions of use of the cell and improves the life of the cell.

DISCLOSURE OF THE INVENTION

In order to achieve the object shown above, the separator for sealed cells of the invention comprises a non-woven fabric having fine rubber particles adhered thereto.

In one aspect of the invention, the fine rubber particles are a nitrile rubber, a chloroprene rubber, or a chlorosulfonated polyethylene.

In another aspect of the invention, the fine rubber particles have a particle diameter of 10 $\mu$m or smaller.

In another aspect of the invention, the content of the adhered fine rubber particles is from 0.1 to 10% by weight.

In yet another aspect of the invention, the non-woven fabric comprises glass fibers.

BEST MODE FOR CARRYING OUT THE INVENTION

Practical modes of this invention will be explained in detail below.

This invention relates to a separator which comprises a non-woven fabric having fine rubber particles adhered thereto and is to be interposed between the electrode plates of a sealed cell. This separator comprises a non-woven fabric formed by randomly superposing fibers and has pores in inner parts thereof due to its structure.

The shape of the separator is not particularly limited, but is preferably in a sheet form so as to fit to the electrode plates of a sealed cell.

The fine rubber particles are adhered to the surface of the non-woven fabric, i.e., to the surface of the constituent fibers (hereinafter simply referred to as "fibers") of the non-woven fabric and are present among the fibers. In particular, the particles are present at intersections of fibers and serve as an adhesive. These fine rubber particles function as elastic bodies to absorb relative positional changes of the fibers and restore them. Namely, due to the presence of the fine rubber particles, the separator has enhanced repulsive force and restoring force upon compression. Although how the fine rubber particles are adhered to the fiber surface is unclear, it is thought that these particles are probably bonded by a physicochemical force.

The kind of the fine rubber particles is not particularly limited. However, it is preferably a nitrile rubber, a chloroprene rubber or a chlorosulfonated polyethylene. This is because these rubbers have high heat resistance and high acid resistance and have an appropriate hardness. Since sealed cells are frequently used in a high temperature environment, fine rubber particles having poor heat resistance deform or soften during use of the cell to lower the degree of intimate contact between the separator and the electrode plates and this in turn increases the internal resistance. Furthermore, fine rubber particles having poor acid resistance may undergo a chemical reaction with the electrolyte in a high temperature environment to inhibit the transport of ions in the electrolyte. On the other hand, in case of fine rubber particles having an inappropriate hardness, the separator is too hard to be compressed or is too soft to have sufficient restoring force and, hence, the necessary degree of intimate contact with electrode plates is not obtained.

The particle diameter of the fine rubber particles is not particularly limited, but is preferably 10 $\mu$m or smaller. In case of fine rubber particles having a particle diameter larger than 10 $\mu$m, they are less apt to be present among fibers and, as a result, the separator has reduced restoring force.

The amount of the adhered fine rubber particles in the separator is not particularly limited, but is preferably from 0.1 to 10% by weight. If the adhesion amount thereof is smaller than 0.1% by weight, the fine rubber particles cannot sufficiently function as elastic bodies, so that the separator has insufficient restoring force. Conversely, if the adhesion amount thereof is larger than 10% by weight, the pores of inner parts of the separator are occupied by fine rubber particles, so that the transport of ions in the electrolyte becomes difficult and the internal resistance becomes high.

Although the kind of the fibers of this separator is not particularly limited, glass fibers are preferred. Glass fibers have high acid resistance, chemical stability, and high durability. Since sealed cells are incapable of separator replacement because of their structure, it is preferred to employ a separator comprising glass fibers in which performance does not deteriorate over a long period of time.

Only one kind of fiber may be used, or a mixture of two or more kinds thereof may be used. By using a mixture of two or more kinds of fibers, properties of the individual fibers can be superposed and new features and uses can be found. For example, a separator mainly comprising glass fibers and containing, mixed therewith, ultrathin organic fibers of, e.g., polyethylene or polypropylene, combines high durability, which is characteristic of glass fibers, with bending resistance or high flexibility, which is characteristic of organic fibers. Consequently, in the case of a cylindrical cell in which electrode plates are spirally wound into a roll, this separator shows higher durability than separators consisting of glass fibers alone or organic fibers alone.

Furthermore, by using core/sheath composite fibers as organic fibers, a new function can be imparted to the separator. The core/sheath composite fiber herein means an organic fiber produced with different kinds of resins for a central part (core part) and a peripheral part (sheath part). In general, a resin having a high melting point and a resin having a low melting point are used for the core part and the sheath part, respectively. In a non-woven fabric containing these core/sheath composite fibers, constituent fibers are bonded to one another by heating at low temperature. In the low temperature heating, only the sheath parts melt, while the core parts retain their original shape. Consequently, this separator is excellent in restoring force and shape stability as compared with the case in which ordinary organic fibers are used.

The glass fibers are preferably that the proportion of fibers having a diameter of 4 $\mu$m or smaller is 50% by weight or higher and the fibers have an average length of 30 mm or shorter. The diameter of the glass fibers is preferably 0.1 $\mu$m or larger and the average length is especially preferably 25 mm or shorter. Processes for producing these glass fibers include a flame fusion method, a rotary method, etc., and the glass fibers which can be produced by these processes have sizes within the range shown above. According to these processes, glass fibers can be produced in large quantities at low cost.

The glass fibers may be surface-treated with a silane coupling agent so as to facilitate the adhesion of fine rubber particles thereto. By coating the surface of the glass fibers with a silane coupling agent, fine rubber particles are tenaciously bonded to the silane coupling agent to improve the restoring force of the separator.

The density of the separator produced with glass fibers is not particularly limited, but is preferably from 0.1 to 0.35 g/cm$^3$. When the density thereof is within this range, the separator has the high ability to retain an electrolyte and facilitates the transfer of ions in the electrolyte. Consequently, the internal resistance is low and layer formation is less apt to occur.

Methods for adhering fine rubber particles to a separator are not particularly limited. However, a preferred method is to mix the rubber particles with fibers in producing a separator. Specifically, examples thereof include sheet formation by a papermaking method or a method in which fibers are piled up in a drying environment (hereinafter referred to as "drying method"). In the case of the papermaking method, fine rubber particles or an emulsion thereof is mixed in an appropriate amount into a slurry of fibers. In the case of the drying method, fibers are caused to fall and accumulate and at the same time, fine rubber particles or an emulsion thereof are sprayed. According to these methods, there is no need to conduct a separate step for adhering fine rubber particles and efficient production is possible.

On the other hand, there also is a method in which fine rubber particles are adhered after a separator has been produced. This is called an immersion method, in which a separator is immersed in an emulsion of fine rubber particles. This method can be practiced with a simple apparatus and is hence suitable for, e.g., the case where production amount is small. The immersion method is used in the following Examples.

EXAMPLES

This invention will be explained below in more detail by means of Examples and Comparative Examples.

Example 1

Glass fibers having an average diameter of 0.8 μm and an average length of 25 mm were suspended and dispersed in water to prepare a slurry, which was subjected to sheet formation by a papermaking method to produce a separator. This separator was in a sheet form of 300×300×2 mm. This separator was immersed in a nitrile rubber emulsion (average diameter of the fine particles: 0.05 μm; concentration: 20 g/liter) to fully infiltrate the emulsion into the inner parts thereof. Thereafter, the separator was dehydrated and heated to remove the emulsion medium and dry the separator. The content of adhered nitrile rubber after the drying was 3% by weight.

Compressibility Measurement

Ten sheets of the separator dried were superposed and a given pressure was applied in the thickness direction to measure the rate of change in thickness, i.e., the compressibility. Higher values of this compressibility mean that it is easier to insert the separator between electrode plates. This compressibility was measured by a method which comprises holding the superposed separators at an initial pressure of 20 kgf/dm$^2$, changing the pressure to 60 kgf/dm$^2$, and measuring the resulting thickness change of the superposed separators with a micrometer. This change is shown in terms of percent based on the separator thickness at the initial pressure. The compressibilities in Examples 1 to 4 and Comparative Examples 1 to 4 are shown in Table 1 below.

Measurement of Restoring Force Retention

Furthermore, superposed separators holding an electrolyte were examined for the retention of repulsive force or restoring force. Higher values of this retention mean that the degree of intimate contact between the separator and electrode plates is higher, i.e., the internal resistance is lower, and that deterioration with time, such as fatigue, is less apt to occur. Separators generally come to have reduced restoring force upon absorption of an electrolyte; the higher the value of the retention, the more the separator retains its restoring force and is suitable for use as a separator for cells. This restoring force retention was measured by a method which comprises infiltrating an electrolyte through a separator kept being compressed at 60 kgf/dm$^2$ and measuring the repulsive force (restoring force) at 60 minutes thereafter. The restoring force at 60 minutes after the electrolyte infiltration is shown in terms of percent based on the restoring force before the infiltration. The results of the measurement of restoring force retention in Examples 1 to 4 and Comparative Examples 1 to 4 are shown in Table 1 below.

Example 2

The procedure is the same as in Example 1, except that a chloroprene rubber (average diameter of the fine particles: 1.2 μm; concentration: 20 g/liter) was used as fine rubber particles. In the superposed separators to which the chloroprene rubber had been adhered, the content of adhered chloroprene rubber was 3% by weight.

Example 3

The procedure is the same as in Example 1, except that the content of adherent nitrile rubber is 0.5% by weight.

Example 4

The procedure is the same as in Example 2, except that a chlorosulfonated polyethylene was adhered as fine rubber particles in place of the chloroprene rubber.

Comparative Example 1

The separator of Example 1 was subjected to the same measurement of compressibility and measurement of restoring force retention as in Example 1 without adhering fine rubber particles thereto.

Comparative Example 2

Silica (average particle diameter: 7 μm) was added in the separator sheet formation by a papermaking method in Example 1. The content of adhered silica in this separator was 20% by weight. This separator was subjected to the same measurements of compressibility and restoring force retention as in Example 1.

Comparative Example 3

The procedure is the same as in Example 1, except that fine polyethylene particles having an average diameter of 5 μm were adhered, in place of the fine rubber particles, in an amount of 0.5% by weight.

Comparative Example 4

The procedure is the same as in Example 1, except that fine polyethylene particles having an average diameter of 5 μm were adhered, in place of the fine rubber particles, in an amount of 3% by weight. Incidentally, this Comparative Example differs from Comparative Example 3 only in the amount of the adhered substance.

TABLE 1

|  | Adhered substance | Content of adhered substance (wt %) | Compressibility (%) | Restoring force retention (%) |
| --- | --- | --- | --- | --- |
| Example 1 | Nitrile rubber | 3 | 30 | 80 |
| Example 2 | Chloroprene rubber | 3 | 30 | 80 |
| Example 3 | Nitrile rubber | 0.5 | 29 | 75 |
| Example 4 | Chlorosulfonated polyethylene | 3 | 30 | 80 |
| Comparative Example 1 | None | 0 | 25 | 50 |

TABLE 1-continued

|  | Adhered substance | Content of adhered substance (wt %) | Compressibility (%) | Restoring force retention (%) |
|---|---|---|---|---|
| Comparative Example 2 | Silica gel | 20 | 10 | 60 |
| Comparative Example 3 | Polyethylene | 0.5 | 27 | 50 |
| Comparative Example 4 | Polyethylene | 3 | 28 | 50 |

The Examples and Comparative Examples given above show the following.

A comparison between Examples 1 to 4 and Comparative Example 1 shows that when fine rubber particles are adhered to a separator, both the compressibility and restoring force retention of the separator improve. Consequently, in this case, the separator can be easily inserted between electrode plates and, even when impregnated with an electrolyte, the separator can retain a high degree of intimate contact with the electrode plates and maintain low internal resistance.

A comparison between Comparative Example 1 and Comparative Example 2 shows that when silica is added to a separator, the compressibility of the separator decreases. Consequently, in this case, it is difficult to insert the separator between electrode plates.

A comparison between Examples 1 to 4 and Comparative Example 2 shows that when fine rubber particles are adhered to a separator, both the compressibility and restoring force retention of the separator become higher than in the case of adding silica. Consequently, the separator can be easily inserted between electrode plates and low internal resistance can be maintained.

Comparisons between Example 1 and Comparative Example 4 and between Example 3 and Comparative Example 3 show that both the compressibility and the restoring force retention are better in the case of using a nitrile rubber or chloroprene rubber than in the case of using fine polyethylene particles. This is thought to be attributable to the fact that the fine polyethylene particles do not function as elastic bodies.

Furthermore, technical ideas which are grasped from the modes shown above are described below.

(1) A separator for sealed cells which comprises a non-woven fabric made of glass fibers in which the proportion of fibers having a diameter of 4 $\mu$m or smaller is 50% by weight or higher and which have an average length of 30 $\mu$m or shorter, and fine rubber particles adhered to the non-woven fabric.

(2) A separator for sealed cells which comprises a non-woven fabric made of glass fibers surface-treated with a silane coupling agent, and fine rubber particles adhered to the non-woven fabric.

(3) A separator for sealed cells which has fine rubber particles adhered to intersections of fibers.

(4) A separator for sealed cells wherein fine rubber particles adhered to fibers have excellent acid resistance.

By incorporating these technical ideas into this invention, a further excellent separator can be obtained.

Industrial Applicability

Since this invention has the constitutions described above, it produces the following effects.

According to the separator for sealed cells as the first aspect of the invention, the compressibility and restoring force retention of a separator can be increased and low internal resistance can be maintained, by adhering fine rubber particles to a non-woven fabric.

According to the separator for sealed cells as the second aspect of the invention, a separator having heat resistance and acid resistance and further having moderate restoring force can be obtained by using a nitrile rubber, chloroprene rubber, or chlorosulfonated polyethylene as fine rubber particles, while producing the effect of the first aspect of the invention.

According to the separator for sealed cells as the third aspect of the invention, fine rubber particles can be evenly adhered to a non-woven fabric because the fine rubber particles have a particle diameter of 10 $\mu$m or smaller, while producing the effect of the first or second aspect of the invention.

According to the separator for sealed cells as the fourth aspect of the invention, the restoring force of a separator can be increased without inhibiting the transport of ions in an electrolyte, because the content of adhered fine rubber particles is from 0.1 to 10% by weight, while producing the effect of any one of the first to third aspects of the invention.

According to the separator for sealed cells as the fifth aspect of the invention, a cell separator having acid resistance, heat resistance, and durability can be obtained by using glass fibers, while producing the effect of any one of the first to fourth aspects of the invention.

What is claimed is:

1. A separator for sealed cells which comprises a non-woven fabric having fine rubber particles adhered thereto, wherein the fine rubber particles have a particle diameter of 10 $\mu$m or smaller.

2. The separator for sealed cells as claimed in claim 1, wherein the fine rubber particles are a nitrile rubber, a chloroprene rubber or a chlorosulfonated polyethylene.

3. The separator for sealed cells as claimed in claim 1, wherein the non-woven fabric comprises glass fibers.

4. The separator for sealed cells as claimed in claim 1, wherein the content of the adherent fine rubber particles is from 0.1 to 10% by weight.

* * * * *